(12) United States Patent
Yamaguchi et al.

(10) Patent No.: US 7,498,101 B2
(45) Date of Patent: Mar. 3, 2009

(54) NON-AQUEOUS ELECTROLYTE SECONDARY BATTERY HAVING A NEGATIVE ELECTRODE CONTAINING CARBON FIBERS AND CARBON FLAKES

(75) Inventors: Akira Yamaguchi, Fukushima (JP); Shinji Hatake, Fukushima (JP); Masayuki Nagamine, Fukushima (JP); Atsuo Omaru, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/564,619

(22) Filed: Nov. 29, 2006

(65) Prior Publication Data

US 2007/0218367 A1   Sep. 20, 2007

Related U.S. Application Data

(60) Division of application No. 10/864,835, filed on Jun. 8, 2004, now Pat. No. 7,172,837, which is a continuation of application No. 09/675,422, filed on Sep. 29, 2000, now Pat. No. 6,806,003.

(30) Foreign Application Priority Data

Sep. 30, 1999 (JP) ............................... P11-278249

(51) Int. Cl.
*H01M 4/62* (2006.01)
(52) U.S. Cl. ............... 429/232; 429/231.95; 429/231.8; 429/231.7; 429/231.1; 429/231.4; 429/337; 429/338; 429/332
(58) Field of Classification Search .................. 429/232, 429/231.95, 231.8, 231.7, 231.1, 231.4, 337, 429/338, 332
See application file for complete search history.

(56) References Cited

U.S. PATENT DOCUMENTS 6,090,506 A   7/2000   Inoue et al.
6,294,291 B1 *  9/2001   Ozaki et al. ............... 429/231.4
6,806,003 B1 * 10/2004   Yamaguchi et al. ......... 429/232
7,172,837 B2 *  2/2007   Yamaguchi et al. ......... 429/232
2003/0129494 A1  7/2003   Kaneda et al.

FOREIGN PATENT DOCUMENTS

| EP | 0871233 | 10/1998 |
| EP | 0871233 A1 | 10/1998 |
| JP | 4-190555 | * 7/1992 |
| JP | 08-180864 | 7/1996 |
| JP | 08-287952 | 11/1996 |
| JP | 08287952 | 11/1996 |
| JP | 09-027344 | 1/1997 |
| JP | 09027344 | 1/1997 |
| JP | 09-213372 | 8/1997 |
| JP | 63264865 | 1/1998 |
| JP | 11-278249 | 10/1999 |
| JP | 2000/058066 | 2/2000 |
| JP | 2000/133267 | 5/2000 |
| JP | 2000-182601 | 6/2000 |
| WO | WO99/00001 | 1/1999 |
| WO | WO 99/00001 | 1/1999 |

OTHER PUBLICATIONS

European Search Report dated Oct. 1, 2008 for Application No. 08005690.6-2119.

* cited by examiner

*Primary Examiner*—Laura S. Weiner
(74) *Attorney, Agent, or Firm*—Sonnenschein Nath & Rosenthal LLP

(57) ABSTRACT

A nonaqueous electrolyte secondary battery is provided with a positive electrode including a positive-electrode active material, a negative electrode including a negative-electrode active material, and a nonaqueous electrolyte solution. The negative electrode further includes carbon fibers and carbon flakes. The synergistic effects of the improved retention of the electrolyte solution by the carbon fibers and the improved conductivity between the active material particles by the carbon flakes facilitate doping/undoping of lithium in a high-load current mode and increase the capacity of the battery in the high-load current mode.

22 Claims, 5 Drawing Sheets

NON-AQUEOUS ELECTROLYTE SECONDARY BATTERY HAVING A NEGATIVE ELECTRODE CONTAINING CARBON FIBERS AND CARBON FLAKES

CROSS-REFERENCE TO RELATED APPLICATIONS

This is a divisional of U.S. application Ser. No. 10/864,835 filed on Jun. 8, 2004, which is a continuation of U.S. application Ser. No. 09/675,422, filed Sep. 29, 2000, now U.S. Pat. No. 6,806,003, and which claims priority from Japanese Application No. P11-278249, filed Sep. 30, 1999. Applicant claims priority to and the benefit of the above-identified applications, the disclosures of which are expressly incorporated herein by reference to the extent permitted by law.

BACKGROUND OF THE INVENTION

The present invention relates to nonaqueous electrolyte secondary batteries having positive-electrode active materials and negative-electrode active materials, which intercalate/deintercalate (or are doped/undoped with) lithium, and non-aqueous electrolyte solutions.

Nickel-cadmium batteries and lead batteries have been used as secondary batteries for electronic devices. Trends toward higher performance and miniaturization of electronic devices due to advanced electronic technology require secondary batteries having higher energy densities. Since nickel-cadmium batteries and lead batteries have low discharge voltages, increases in the energy densities are limited.

Nonaqueous electrolyte secondary batteries using carbonaceous materials capable of intercalating/deintercalating lithium in negative electrodes and lithium compound oxides in positive electrodes have been vigorously developed instead of the nickel-cadmium batteries and lead batteries, since the nonaqueous electrolyte secondary batteries, called lithium ion batteries, have high discharge voltages and reduced self-discharge, and have prolonged cycle lives.

In these nonaqueous electrolyte secondary batteries, carbonaceous materials such as graphite are used as negative-electrode active materials, $Li_xMO_2$ wherein M is at least one transition metal and $0.05<x<1.10$ is used as positive-electrode active materials, and $LiPF_6$ and $LiBF_4$ are used as electrolytes. As organic solvents for dissolving the electrolytes, propylene carbonate, ethylene carbonate, γ-butyrolactone, diethyl carbonate, ethyl methyl carbonate, dimethyl carbonate, ethyl acetate, methyl propionate, 1,2-dimethoxyethane, and 2-methyltetrahydrofuran are used.

The nonaqueous electrolyte secondary batteries are suitable as power sources for portable electronic devices. In recent years, compact battery packs including batteries and protective circuits have been frequently used with requirements for reduced sizes and weight. In the batteries in the battery packs, higher capacities at large-current discharging modes are required. In order to fulfill such a requirement, improvements in negative electrodes are essential in addition to improvements in positive electrodes and nonaqueous electrolyte solutions.

Current nonaqueous electrolyte secondary batteries, however, are still unsatisfactory as regards improvements in capacities during large-current discharging modes by improvements in negative electrodes.

BRIEF SUMMARY OF THE INVENTION

Accordingly, it is an object of the present invention to provide a nonaqueous electrolyte secondary battery having satisfactory capacity characteristics during a large-current discharging mode.

According to an aspect of the present invention, a nonaqueous electrolyte secondary battery comprises a positive electrode comprising a positive-electrode active material, a negative electrode comprising a negative-electrode active material, the positive-electrode active material and the negative-electrode active material capable of intercalating/deintercalating lithium, and a nonaqueous electrolyte solution, wherein the negative electrode further comprises carbon fibers and carbon flakes.

The carbon fibers and carbon flakes can be disposed in the interstices between the negative-electrode active material particles in this configuration. Moreover, the carbon fibers improves retention of the nonaqueous electrolyte solution and the carbon flakes disposed between the active material particles improves conductivity (reduces internal resistance). These synergistic effects improve the capacity characteristics of the nonaqueous electrolyte secondary battery. In this nonaqueous electrolyte secondary battery, lithium is smoothly doped or undoped at large-current charge or discharge conditions, resulting in high capacity at the high-current load.

In this nonaqueous electrolyte secondary battery, the content of the carbon fibers in the negative electrode is in a range of preferably 0.02 percent by weight to 5 percent by weight and more preferably 0.5 percent by weight to 4 percent by weight, and the content of the carbon flakes in the negative electrode is in a range of preferably 0.1 percent by weight to 30 percent by weight, more preferably 1 percent by weight to 20 percent by weight, most preferably 1 percent by weight to 10 percent by weight.

Moreover, the ratio by weight of the carbon flakes to the carbon flakes to the carbon fibers in the negative electrode is in a range of preferably 0.2 to 100 and more preferably 0.4 to 20.

In a preferred embodiment of the present invention, the nonaqueous electrolyte secondary battery comprises an electrode composite in which a positive electrode including a lithium compound oxide as the positive-electrode active material and a negative electrode including a carbonaceous material as the negative-electrode active material are wound with a separator disposed therebetween (called a jelly roll type).

DETAILED DESCRIPTION OF THE INVENTION

Preferred embodiments of the present invention will now be described in detail with reference to the drawings.

Figure 5:
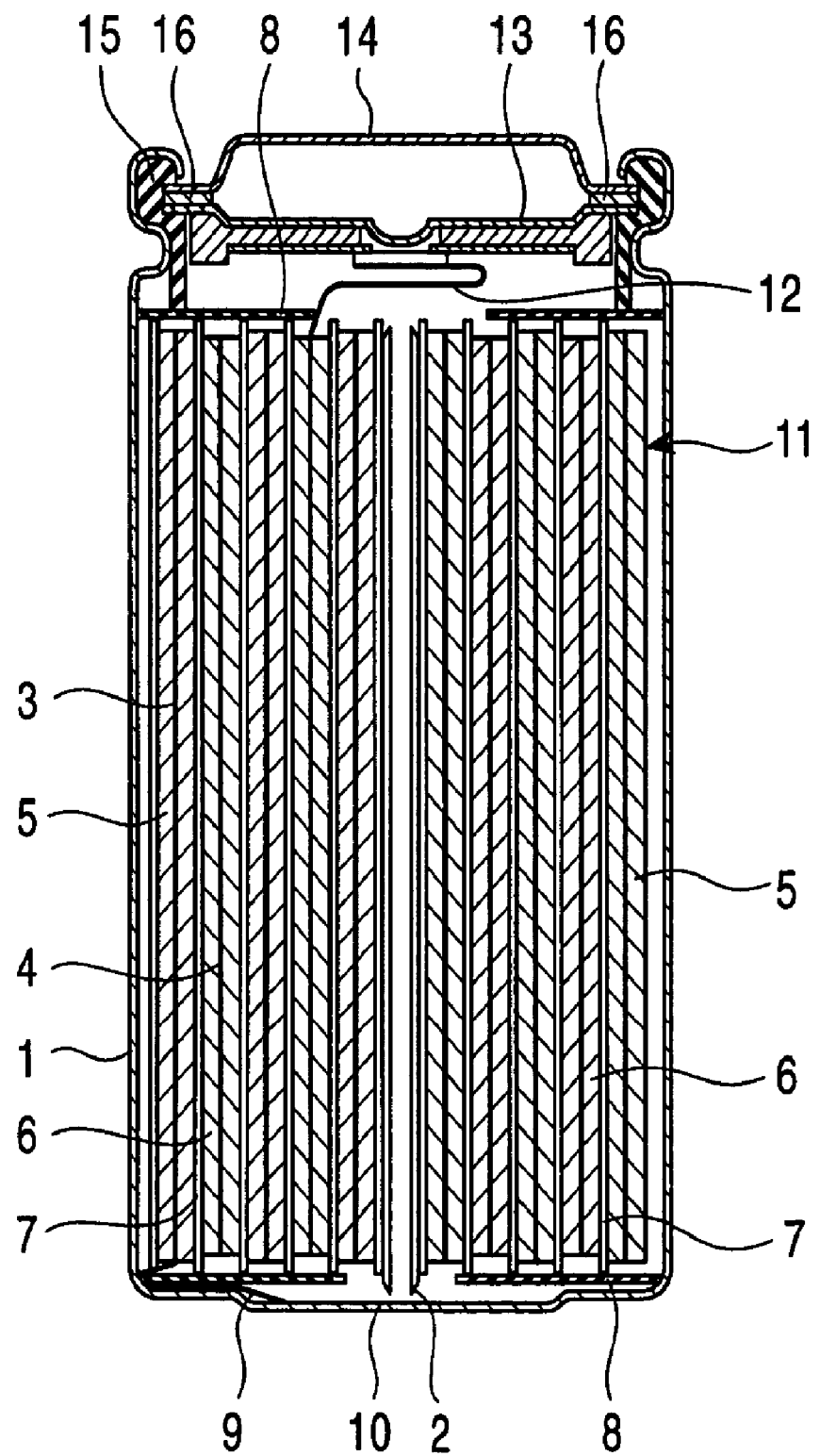
FIG. 5 is a longitudinal cross-sectional view of a nonaqueous electrolyte secondary battery in accordance with an embodiment of the present invention.

FIG. 5 is a longitudinal cross-sectional view of a nonaqueous electrolyte secondary battery in accordance with an embodiment of the present invention. This secondary battery includes an electrode composite 11 between a cylindrical casing 1 and a mandrel 2, in which a stack of a collector 3 and a negative electrode 5 and another stack of a collector 4 and a positive electrode 6 are alternately wound with a separator 7 provided therebetween. The electrode composite 11 contains a nonaqueous electrolyte solution (not shown in the drawing). Insulating plates 8 are provided on and under the electrode composite 11. The electrode composite 11 is covered by the bottom 10 of the battery casing at the bottom section and by a safety valve 13 and a lid 14 at the top section. The bottom 10 of the battery casing is connected to a negative lead 9, whereas the lid 14 is connected to a positive lead 12. The safety valve 13 is provided to release pressurized internal gas generated by charging/discharging cycles. A gasket 15 insulates the positive electrode and the negative electrode from each other. The secondary battery further has a positive temperature coefficient (PTC) element 16 to prevent overdischarge and overcharge currents.

Both the negative electrode 5 and the positive electrode 6 can intercalate/deintercalate (can be doped/undoped with) lithium in this nonaqueous electrolyte secondary battery. The negative electrode 5 and the positive electrode 6 are separated by the separator 7 and are immersed in the nonaqueous electrolyte solution of an organic solvent and a lithium compound.

The positive electrode 6 comprises a positive-electrode active material such as a lithium compound oxide, whereas the negative electrode 5 comprises a negative-electrode active material, such as graphite. The negative electrode 5 further comprises carbon fibers and carbon flakes. These active materials are held on the collectors 3 or 4 composed of a metal foil or the like and are used as electrodes. Both the positive-electrode active material and the negative-electrode active material have layered molecular structures, which can intercalate and deintercalate lithium.

These electrode materials do not substantially react with the nonaqueous electrolyte solution and lithium and migrates in the nonaqueous electrolyte solution. In a discharging mode, lithium is detached from the negative electrode 5, passes through the separator 7, and is intercalated in the positive electrode 6. In a charging mode, lithium is detached from the positive electrode 6, passes through the separator 7, and is intercalated in the negative electrode 5.

Figure 1:
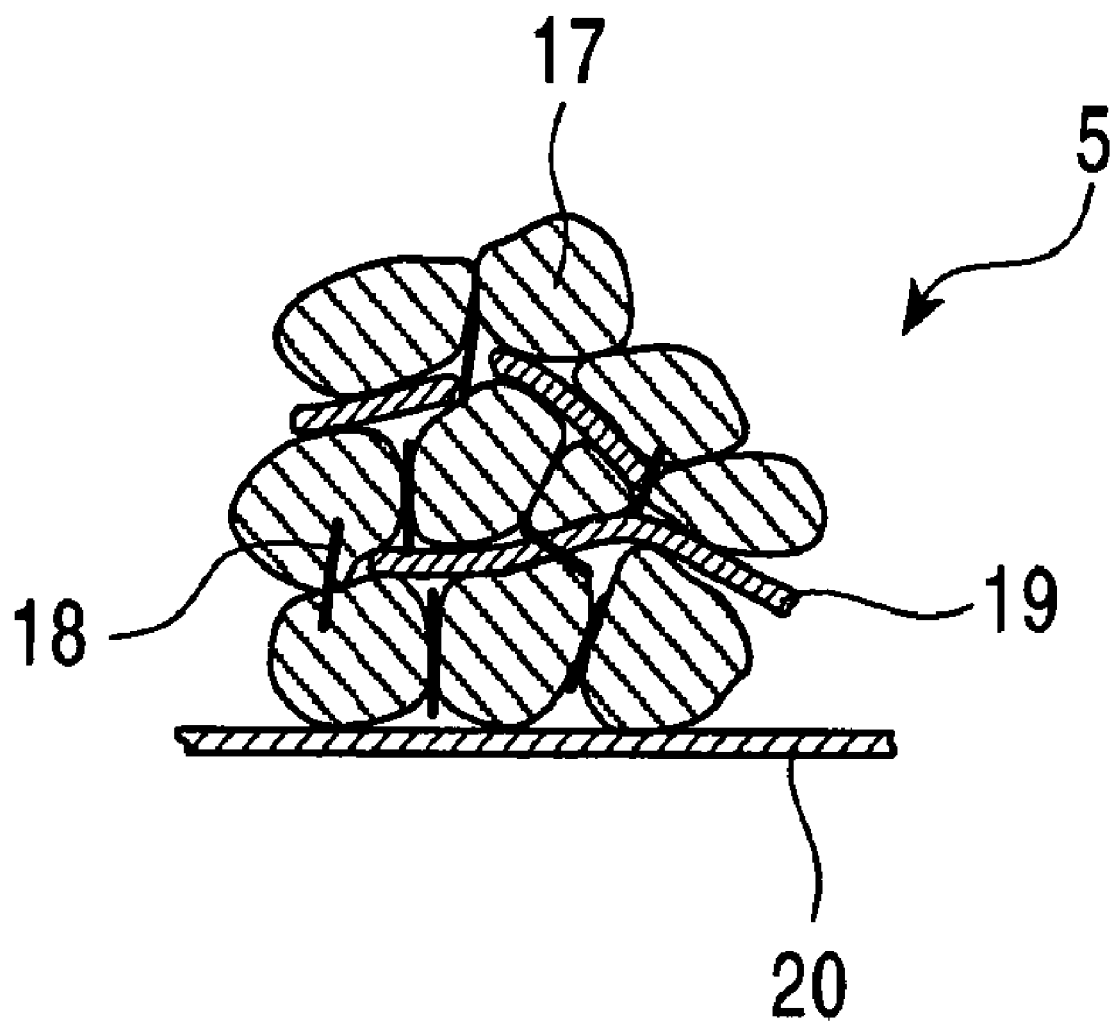
FIG. 1 is an enlarged cross-sectional view of a negative electrode in accordance with an embodiment of the present invention.

In this embodiment, as shown in FIG. 1, the negative electrode 5 comprises particles 17 of a negative-electrode active material which are bonded to each other with a binder (not shown in the drawing) on the collector 20 composed of, for example, copper. The negative electrode 5 further includes carbon fibers 18. Since the carbon fibers 18 are thin and long compared to the particles 17, these are disposed in the interstices between the negative-electrode active material particles 17. Since the nonaqueous electrolyte solution can be immersed in the overall interstices between the negative-electrode active material particles 17, this configuration can improve the retention of the nonaqueous electrolyte solution. In the present invention, carbon flakes 19 are also included in the negative-electrode active material particles 17. Since the carbon flakes 19 are flat and have high electron conductivity due to high crystallinity, the flakes enter the interstices between the negative-electrode active material particles 17 and improve the contact between these particles 17, resulting in improvement in conductivity between the negative-electrode active material particles 17.

In order to secure the above effects, the content of the carbon fibers in the negative electrode is in a range of preferably 0.02 percent by weight to 5 percent by weight and more preferably 0.5 percent by weight to 4 percent by weight, and the content of the carbon flakes in the negative electrode is in a range of preferably 0.1 percent by weight to 30 percent by weight, more preferably 1 percent by weight to 20 percent by weight, most preferably 1 percent by weight to 10 percent by weight. Moreover, the ratio by weight of the carbon flakes to the carbon fibers in the negative electrode is in a range of preferably 0.2 to 100 and more preferably 0.4 to 20. The content of the negative-electrode active material particles 17 is preferably in a range of 65 to 99.88 percent by weight.

Preferably, the carbon fibers have an average diameter of 0.01 to 1 μm and an average length of 1 to 100 μm, and the carbon flakes have an average diameter of 0.5 to 50 μm and an average thickness of 0.01 to 1 μm. The negative-electrode active material particles 17 preferably have an average diameter of 1 to 100 μm.

The materials constituting the positive electrode 6 will now be described in more detail.

As the negative-electrode active materials which can intercalate and deintercalate lithium, for example, carbonaceous materials can be used. Examples of carbonaceous materials include pyrolyzed carbon, cokes such as pitch coke, needle coke, and petroleum coke, graphite, glassy carbon, baked organic polymers, such as phenol resin and furan resin, carbon fibers, and activated charcoal.

Other usable materials for the negative electrode are, for example, crystalline and amorphous metal oxides which can intercalate/deintercalate lithium. Among these materials, graphite, soft carbon (graphitizable carbon), and hard carbon (nongraphitizable carbon) are preferable. It is preferable that the material for the negative electrode contain a certain amount of resin component.

The graphite may be natural graphite or artificial graphite. A preferable graphite has a $d_{002}$ distance (a degree of graphitization) of approximately 0.336 nm, an $L_c$ value (the thickness of the layer in the c axis) of more than 100, a $D_{50}$ particle size of approximately 30 nm, and a BET value (an index for the specific surface area) of approximately 2 $m^2/g$. A preferable hard carbon has a $d_{002}$ distance of approximately 0.37 to 0.38 nm.

This negative-electrode active material, which can intercalate/deintercalate lithium, is mixed with the carbon fibers and the carbon flakes to form the negative electrode.

The carbon fibers can be provided by a heat treatment of a precursor which is composed of fibrous polymer or pitch, or by vapor deposition in which a stream of a vaporized organic material, such as benzene, is directly exposed to a substrate at a temperature of approximately 1,000° C. so that carbon crystals grow in the presence of iron particles as a catalyst.

Polymer precursors when carbon fibers are provided by the heat treatment are polyacrylonitrile (PAN) and rayon. Polyamide, lignin, and polyvinyl alcohol are also usable.

Examples of pitch-based precursors include coal tar, ethylene bottom products, tars which are produced by high-temperature cracking of crude oil, products from asphalt by distillation, such as vacuum distillation, atmospheric distillation, or steam distillation, thermal condensation, extraction, or chemical condensation, and pitch formed during carbonization of wood.

Also, examples of starting materials for the pitch include polyvinyl chloride resin, polyvinyl acetate, polyvinyl butyral, and 3,5-dimethylphenol.

In the carbonization process, the pitch from charcoal is present as liquid at a temperature of up to about 400° C., and aromatic rings are accumulated and oriented by condensation and polycyclization at the temperature. The accumulated aromatic rings are converted to a solid precursor, that is, semi-coke, at a temperature of 500° C. or more. This process is called a liquid-phase carbonization process which is a typical process for graphitizable carbon.

Examples of usable raw materials for the pitch include fused polycyclic hydrocarbons, such as naphthalene, phenanthrene, anthracene, triphenylene, pyrene, perylene, pentaphene, and pentacene; derivatives thereof, such as carboxylic acids, carboxylic anhydrides, and carboxylic imides; mixtures thereof; fused heterocyclic compounds, such as acenaphthylene, indole, isoindole, quinoline, isoquinoline, quinoxaline, phthalazine, carbazole, acridine, phenazine, and phenanthrazine; and derivatives thereof.

Both polymer-based precursors and pitch-based precursors are subjected to infusibilization or stabilization and then a heat treatment at high temperatures to form carbon fibers. In the infusibilization, the surface of the precursor is oxidized with oxygen or ozone so that the precursor is not fused nor pyrolyzed during carbonization. Although the process can be appropriately determined depending on the type of the precursor, the infusibilization temperature must be lower than the melting point of the precursor. The infusibilization may be repeated several times, if necessary, to sufficiently stabilize the precursor.

The infusibilized or stabilized precursor is carbonized in a nitrogen or inert gas atmosphere at 300 to 700° C. Next, the precursor is calcined in an inert gas atmosphere at a heating rate of 1 to 100° C./min and then at a constant temperature of 900 to 1,500° C. for 0 to 30 hours to form the carbon fibers. The carbonization can be omitted in some cases.

When the carbon fibers are produced by vapor phase deposition, any vaporizable organic compound can be used as a starting material. Examples of such materials include vaporizable materials at room temperatures, such as benzene, ethylene, and propane, and organic compounds which are vaporizable at temperatures less than pyrolytic temperatures thereof. The vaporized organic compound is directly exposed to a hot substrate so that fibrous carbon crystals grow. The temperature is preferably in a range of 400° C. to 1,500° C. and depends on the type of the organic starting material. The substrate is preferably selected from quartz and nickel, and depends on the type of the organic starting material.

Any catalyst may used to promote the crystal growth. Examples of usable catalysts are particles of iron, nickel, and a mixture thereof. Also, metals and oxides thereof, which are called graphitizing catalysts, are used. The diameter and the length of the carbon fibers can be appropriately determined by the production conditions.

When the polymer is used as the raw material, the diameter and the length can be appropriately determined by the inner diameter of a nozzle and a drawing rate from the nozzle when the fibers are produced. When the vapor deposition process is used, the sizes of the substrate and the catalyst which function as nuclei for the crystal growth are appropriately selected to determine the optimum diameter of the fibers. The feeding rate of the organic compound, such as ethylene or propane, determines the diameter and the linearity of the fibers.

The carbon fibers may be graphitized in an inert gas atmosphere at a heating rate of 1 to 100° C./min and then at a constant temperature of 2,000° C. or more (preferably 2,500° C. or more) for 0 to 30 hours. The resulting carbon fibers may be pulverized depending on the thickness of the electrode and the particle size of the active material. Filaments produced during spinning are also usable. The pulverization may be performed before or after the carbonization or calcination, or in the heating step before the graphitizing.

The carbon flakes may be natural graphite or artificial graphite which are formed by carbonization and heat-treating an organic material such as coal or pitch.

The natural graphite is quarried in China, Madagascar, Sri Lanka, Mexico, and Brazil. The graphite ores contain many organic impurities. In particular, metal elements are electrochemically dissolved and will adversely affect the performance of the battery. Thus, the impurities are preferably removed using a solvent. Examples of such solvents include an aqueous inorganic acid solution containing hydrogen fluoride or hydrogen chloride, an organic acid solution, an aqueous alkaline solution containing sodium hydroxide, an aqueous alkaline organic solution, and an organic solvent.

Examples of pitches include coal tar, ethylene bottom products, tars which are produced by high-temperature cracking of crude oil, products from asphalt by distillation, such as vacuum distillation, atmospheric distillation, or steam distillation, thermal condensation, extraction, or chemical condensation, and pitch formed during carbonization of wood.

Also, examples of starting materials for the pitch include polyvinyl chloride resin, polyvinyl acetate, polyvinyl butyral, and 3,5-dimethylphenol.

Examples of usable raw materials for the pitch include fused polycyclic hydrocarbons, such as naphthalene, phenanthrene, anthracene, triphenylene, pyrene, perylene, pentaphene, and pentacene; derivatives thereof, such as carboxylic acids, carboxylic anhydrides, and carboxylic imides; mixtures thereof; fused heterocyclic compounds, such as acenaphthylene, indole, isoindole, quinoline, isoquinoline, quinoxaline, phthalazine, carbazole, acridine, phenazine, and phenanthrazine; and derivatives thereof.

In the formation of desired granular carbon from the above organic material, for example, the organic material is carbonized in an inert gas atmosphere at 300 to 700° C. The carbonized material is calcined in an inert gas atmosphere at a heating rate of 1 to 100° C./min and then at a holding temperature of 900 to 1,500° C. for 0 to 30 hours to form a graphitizable carbonaceous material, and is heat-treated at 2,000° C. or more and preferably 2,500° C. or more. The carbonization and calcination may be omitted in some cases.

The natural or artificial graphite material is pulverized and classified to prepare graphite flakes. The graphite material must have high crystallinity in order to obtain the graphite flakes. Flatter flakes are obtainable by cleaving between carbon hexagonal planes which are weakly bonded by van der Waals forces. The high degree of crystallinity is required for achieving sufficient electron conductivity as a conductor.

The carbon flakes preferably have a (002) interplanar spacing of less than 0.3360 nm by X-ray diffractometry and a thickness of (002) c-axis crystallites of 100 nm or more. Preferably, the bulk density measured according to Japanese Industrial Standard (JIS) K-1469 is 0.4 g/cm3 or less, and the maximum particle size by laser diffraction is 50 μm or less.

The positive electrode material is not limited in the present invention. It is preferable that the positive electrode contain a sufficient amount of lithium. Preferable positive electrode materials are metal compound oxides represented by the general formula $LiM_xO_y$ comprising lithium and transition metals wherein M is at least one selected from Co, Ni, Mn, Fe, Al, V, and Ti; and intercalation compounds containing lithium.

Examples of the binder for binding the negative-electrode materials and the positive electrode materials are polyvinylidene fluoride, polytetrafluoroethylene, an ethylene-propylene-diene copolymer, a styrene-butadiene rubber, a polyimide, a polyamide-imide, polyvinyl alcohol, and carboxymethyl cellulose.

Examples of the nonaqueous electrolytes include electrolyte solutions of electrolytes dissolved in nonaqueous solvents, solid electrolyte media of electrolytes in polymers, and gelatinous electrolyte solutions of plasticizers and electrolytes dissolved in polymers. Examples of polymers include silicones, polyacrylates, polyacrylonitrile, and polyethylene oxide; mixtures, crosslinked polymers, and modified polymers thereof; and fluorinated polymers, such as polyvinylidene fluoride, polyhexafluororopropylene, polytrifluoroethylene, copolymers thereof, and mixtures thereof. As the plasticizers, nonaqueous solvents and organic solvents are usable.

Also, known solutions of electrolytes in organic solvents are usable. Examples of the organic solvents include propylene carbonate, ethylene carbonate, vinylene carbonate, dimethyl carbonate, diethyl carbonate, methyl ethyl carbonate, 1,2-dimethoxyethane, 1,2-diethoxyethane, (-butyrolactone, tetrahydrofuran, 1,3-dioxolane, 4-methyl-1,3-dioxolane, diethyl ether, sulfolane, methylsulfolane, acetonitrile, and propionitrile. Examples of the electrolytes include $LiClO_4$, $LiAsF_6$, $LiPF_6$, $LiBF_4$, $LiB(C_6H_5)_4$, LiCl, LiBr, $CH_3CO_2Li$, $CF_3SO_3Li$, and $(CnF_{2n+1}SO_3)_2NLi$.

The nonaqueous electrolyte secondary battery in accordance with the present invention may have any shape according to use. Examples of the shapes are cylindrical shown in FIG. 5, buttons, prisms, and coins.

As described above, in the nonaqueous electrolyte secondary battery in accordance with the present invention, the carbon fibers and the carbon flakes are disposed in the interstices between the negative material particles. The carbon fibers improve the retention of the electrolyte solution while the carbon flakes improve conductivity between the active material particles. These synergistic effects reduce the internal resistance in the battery and facilitate doping/undoping of lithium under a large-current discharging condition (a high-load current mode), resulting in improved capacity characteristics in a high-load current mode. The negative electrode composed of such a composite material has high packing density and has low internal resistance or high conductivity. As a result, the nonaqueous electrolyte secondary battery of the present invention has high energy density.

EXAMPLES

Examples of the present invention will now be described

Example 1

To 100 parts by weight of coal coke as a filler, 30 parts by weight of coal tar pitch as a binder was added. These were mixed at approximately 100° C., and were compression-molded by a press to form a precursor. The precursor was heat-treated at 1,000° C. or less to form a carbonaceous molded article. The carbonaceous molded article was subjected to a pitch impregnation step for impregnating a binder pitch melted at 200° C. or less therein and a calcination step for heating at 1,000° C. or less. These steps were repeated several times. The carbonaceous molded article was heat-treated in an inert gas atmosphere at 2,700° C. to form a graphitized molded article. The graphitized molded article was pulverized and classified to prepare negative-electrode active material particles.

This graphite material had a $d_{002}$ distance of approximately 0.337 nm, a thickness of the c-axis crystallites in the (002) plane of 50.0 nm, a sphericity by pycnometry of 2.23, a bulk density of 0.83 g/cm$^3$, an average shape parameter $X_{ave}$ of 10, a BET specific area of 4.4 m$^2$/g, an average particle diameter by laser diffractometry of 31.2 μm, an 10% accumulated particle size of 12.3 μm, a 50% accumulated particle size of 29.5 μm, a 90% accumulated particle size of 53.7 μm, and an average rupture strength of graphite particles of 7.1 kgf/mm$^2$.

The resulting powdered sample was mixed with 1 percent by weight of carbon fibers VGCF having an average diameter of 0.2 μm and an average length of 15 μm made by Showa Denko K.K. and 5 percent by weight of carbon flakes KS-15 having an average diameter of 9 ~m and an average thickness of 0.1 μm made by Lonza A.G.

Using the mixture as a negative electrode material, a cylindrical nonaqueous electrolyte secondary battery shown in FIG. 5 was fabricated, as follows. A negative electrode composition was prepared by mixing 90 parts by weight of the mixture and 10 parts by weight of polyvinylidene fluoride (PVDF) as a binder and was dispersed into N-methylpyrrolidone to form a slurry. The slurry was applied on both faces of a collector 3 of a copper foil strip having a thickness of 10 μm, was dried, and was compressed under a predetermined pressure to form a negative electrode strip 5.

A positive-electrode active material was prepared as follows. A mixture of 0.5 mole lithium carbonate and 1 mole cobalt carbonate was sintered in air at 900° C. for 5 hours. The X-ray diffraction pattern of the resulting material agreed with that of $LiCoO_2$ registered in the JCPDS (Joint Committee Powder Diffraction Standards) file.

The $LiCoO_2$ was pulverized. The $LiCoO_2$ powder had an 50% accumulated particle size by laser diffractometry of 15 μm. Next, 95 parts by weight of $LiCoO_2$ powder and 5 parts by weight of lithium carbonate were mixed, and 91 parts by weight of mixture, 6 parts by weight of flake graphite as a conductor, and 3 parts by weight of polyvinylidene fluoride as a binder were mixed to prepare a positive electrode composition. The composition was dispersed into N-methylpyrrolidone to form a slurry. The slurry was applied on both faces of a collector 4 of a copper foil strip having a thickness of 20 μm, was dried, and was compressed under a predetermined pressure to form a positive electrode strip 6.

As shown in FIG. 5, a separator 7 formed of a microporous polypropylene film having a thickness, the negative electrode 5, another separator 7, and the positive electrode 6 were stacked and were wound several times to form a spiral electrode composite 11 which was able to be contained in a casing having an outer diameter of 18 mm.

The spiral electrode composite 11 was contained in a nickel-plated iron casing 1. Insulating plates 8 were placed on and under the spiral electrode composite 11. An aluminum positive-electrode lead 12 extending from the positive-electrode collector 4 and a nickel negative-electrode lead 9 extending from the negative-electrode collector 3 were welded to a lid 4 and the casing 1, respectively.

An electrolyte solution in which an equivolume mixture of ethylene carbonate (EC) and dimethyl carbonate (DMC) was dissolved in $LiPF_6$ in a concentration of 1.0 mol/l was injected into the casing 1. The casing 1 was caulked using an insulating gasket 15 which was coated with asphalt to fix a safety valve 13, a PTC element 16, and a lid 14 and to ensure hermetic sealing of the battery. A cylindrical nonaqueous electrolyte secondary battery having a diameter of 18 mm and a height of 65 mm was thereby prepared.

Example 2

A nonaqueous electrolyte secondary battery was prepared as in Example 1, but 3 percent by weight of VGCF and 5 percent by weight of KS-15 were mixed therein.

Example 3

A nonaqueous electrolyte secondary battery was prepared as in Example 1, but 4 percent by weight of VGCF and 5 percent by weight of KS-15 were mixed therein.

Example 4

A nonaqueous electrolyte secondary battery was prepared as in Example 1, but 4.8 percent by weight of VGCF and 5 percent by weight of KS-15 were mixed therein.

Example 5

A nonaqueous electrolyte secondary battery was prepared as in Example 1, but 5 percent by weight of VGCF and 5 percent by weight of KS-15 were mixed therein.

Example 6

A nonaqueous electrolyte secondary battery was prepared as in Example 1, but 0.5 percent by weight of VGCF and 5 percent by weight of KS-15 were mixed therein.

Example 7

A nonaqueous electrolyte secondary battery was prepared as in Example 1, but 0.05 percent by weight of VGCF and 5 percent by weight of KS-15 were mixed therein.

Example 8

A nonaqueous electrolyte secondary battery was prepared as in Example 1, but 0.02 percent by weight of VGCF and 5 percent by weight of KS-15 were mixed therein.

Example 9

A nonaqueous electrolyte secondary battery was prepared as in Example 1, but 1 percent by weight of VGCF and 10 percent by weight of KS-15 were mixed therein.

Example 10

A nonaqueous electrolyte secondary battery was prepared as in Example 1, but 1 percent by weight of VGCF and 20 percent by weight of KS-15 were mixed therein.

Example 11

A nonaqueous electrolyte secondary battery was prepared as in Example 1, but 1 percent by weight of VGCF and 28 percent by weight of KS-15 were mixed therein.

Example 12

A nonaqueous electrolyte secondary battery was prepared as in Example 1, but 1 percent by weight of VGCF and 30 percent by weight of KS-15 were mixed therein.

Example 13

A nonaqueous electrolyte secondary battery was prepared as in Example 1, but 1 percent by weight of VGCF and 1 percent by weight of KS-15 were mixed therein.

Example 14

A nonaqueous electrolyte secondary battery was prepared as in Example 1, but 1 percent by weight of VGCF and 0.5 percent by weight of KS-15 were mixed therein.

Example 15

A nonaqueous electrolyte secondary battery was prepared as in Example 1, but 1 percent by weight of VGCF and 0.2 percent by weight of KS-15 were mixed therein.

Example 16

A nonaqueous electrolyte secondary battery was prepared as in Example 1, but 1 percent by weight of VGCF and 0.1 percent by weight of KS-15 were mixed therein.

Example 17

A nonaqueous electrolyte secondary battery was prepared as in Example 1, but the VGCF and the KS-15 were not mixed therein.

Example 18

A nonaqueous electrolyte secondary battery was prepared as in Example 1, but only 1 percent by weight of VGCF was mixed therein.

Example 19

A nonaqueous electrolyte secondary battery was prepared as in Example 1, but only 5 percent by weight of KS-15 was mixed therein.

Example 20

A nonaqueous electrolyte secondary battery was prepared as in Example 1, but 0.01 percent by weight of VGCF and 5 percent by weight of KS-15 were mixed therein.

Example 21

A nonaqueous electrolyte secondary battery was prepared as in Example 1, but 6 percent by weight of VGCF and 5 percent by weight of KS-15 were mixed therein.

Example 22

A nonaqueous electrolyte secondary battery was prepared as in Example 1, but 1 percent by weight of VGCF and 0.05 percent by weight of KS-15 were mixed therein.

Example 23

A nonaqueous electrolyte secondary battery was prepared as in Example 1, but 1 percent by weight of VGCF and 40 percent by weight of KS-15 were mixed therein.

Evaluation of Battery Characteristics

Each secondary battery was charged under a constant-voltage, constant-current condition of a constant current of 0.5 A and a maximum voltage 4.2 V for 4 hours at 23° C. The secondary battery was discharged at a constant current of 0.5 A at 23° C. until the final voltage reached 2.75 V to determine the initial capacity. Next, the secondary battery was charged under a constant-voltage, constant-current condition of a constant current of 1.0 A and a maximum voltage 4.2 V for 2.5 hours at 23° C. An AC impedance was measured at a frequency of 1 KHz and an applied voltage of 10 mV to determine the internal resistance of the battery. Next, the secondary battery was discharged at a constant current of 5 A at 23° C. until the final voltage reached 2.7 S V to determine the battery capacity.

Figure 2:
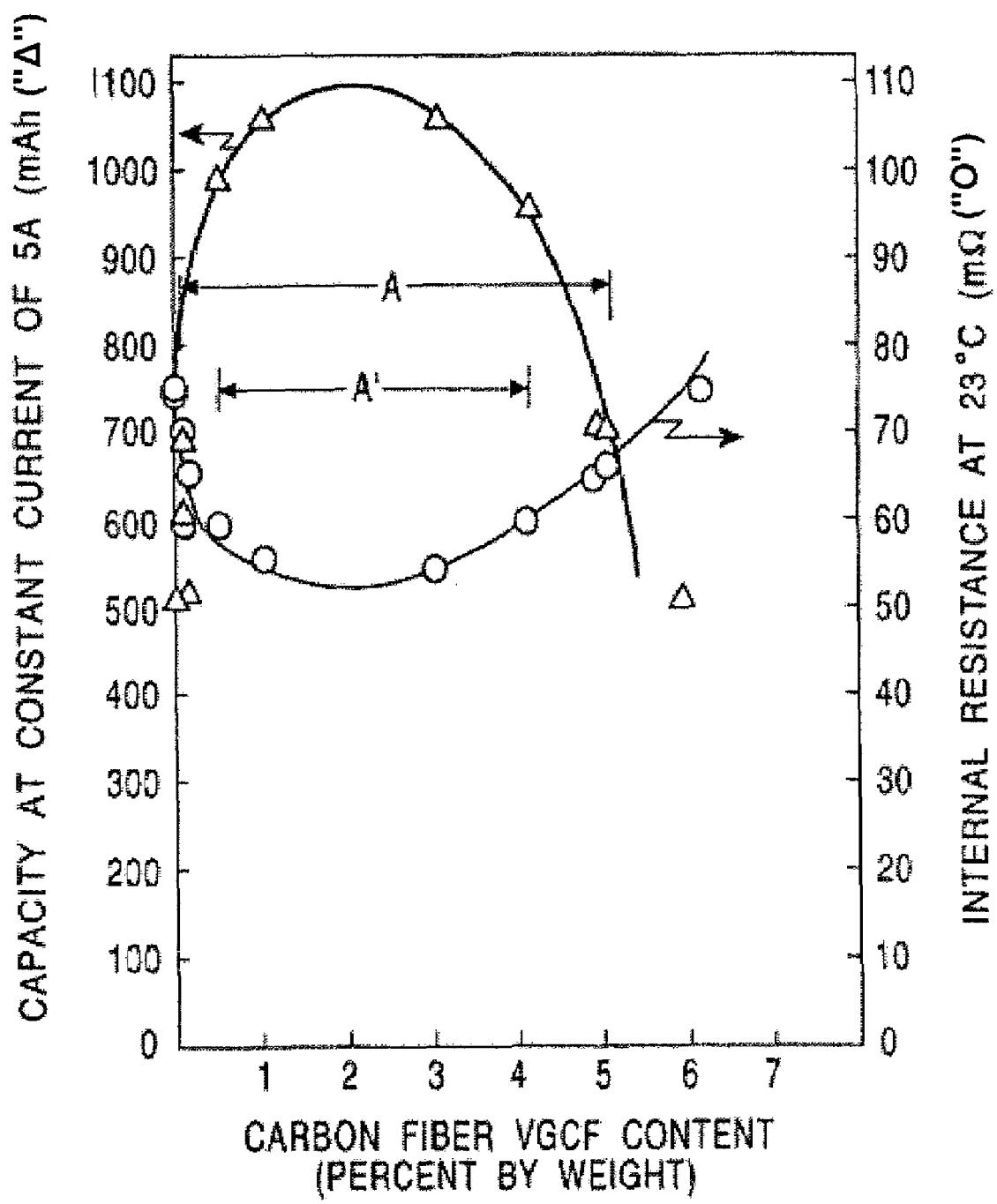
FIG. 2 is a line and scatter graph showing the relationships between the capacity at a constant current of 5 A and the content of carbon fibers VGCF (triangles) in a negative electrode and between the internal resistance at 23° and the carbon fiber content (circles)
Figure 3:
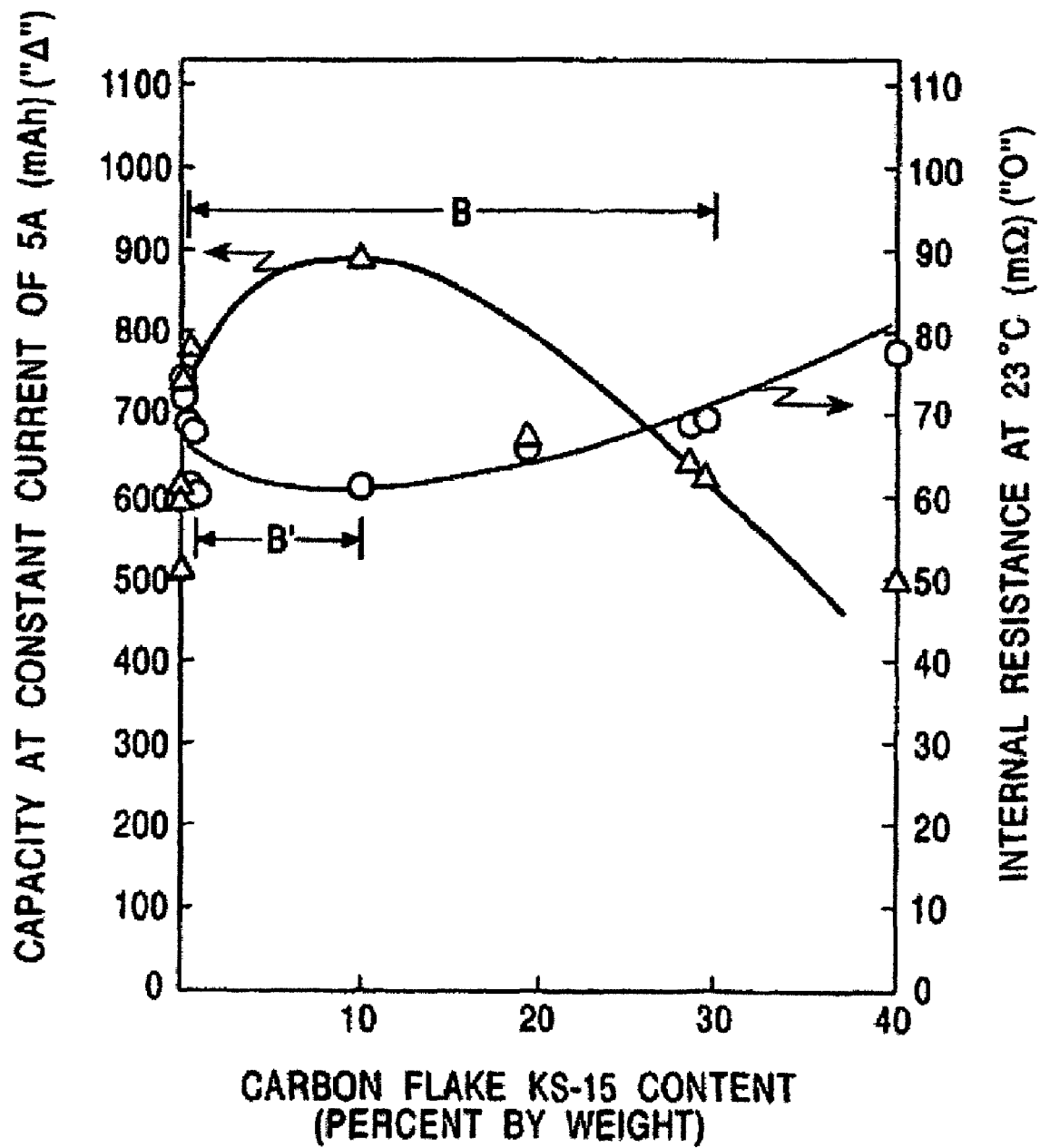
FIG. 3 is a line and scatter graph showing the relationships between the capacity at a constant current of 5 A and the content of carbon flakes KS-15 (triangles) in a negative electrode and between the internal resistance at 23° and the carbon flake content (circles)
Figure 4:
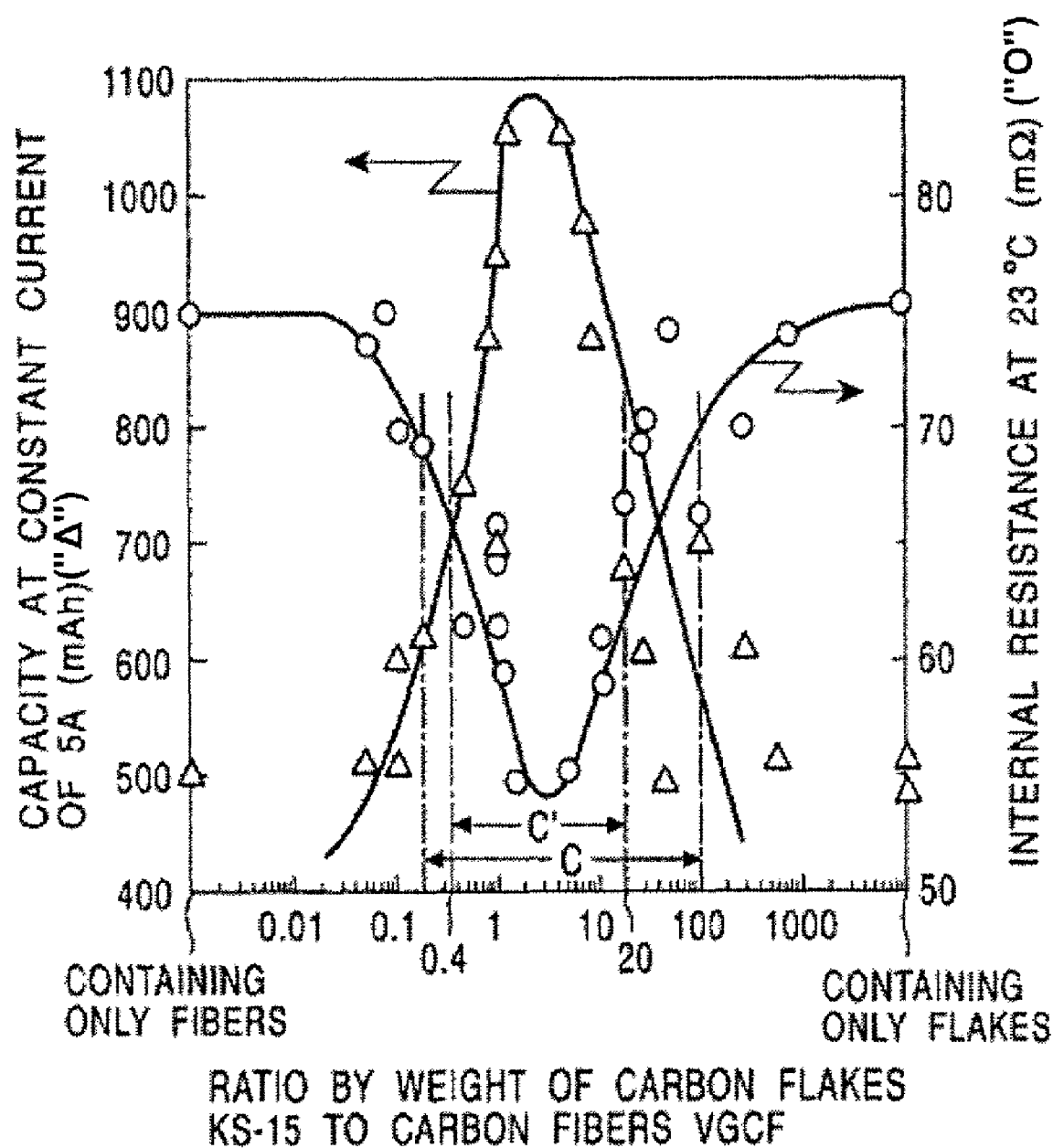
FIG. 4 is a line and scatter graph showing the relationships between the capacity at a constant current of 5 A and the ratio by weight of carbon flakes to carbon fibers (triangles) in a negative electrode and between the internal resistance at 23° and the ratio (circles)

Table 1 shows the results. FIG. 2 shows the dependence of battery characteristics when the KS-IS content is fixed to 5 percent by weight, and FIG. 3 shows the dependence of battery characteristics on the KS-15 content when the VGCF content is fixed to 1 percent by weight. FIG. 4 shows the dependence of battery characteristics on the ratio by weight of the KS-15 to the VGCF.

FIG. 1 is a schematic view of a scanning electron microscope cross-section of a negative electrode. The carbon fibers and carbon flakes are disposed in the interstices between the negative-electrode active material particles. The synergistic effects of the improved retention of the electrolyte solution by the carbon fibers and the improved conductivity between the active material particles by the carbon flakes facilitate doping/undoping of lithium in a high-load current mode and increase the capacity of the battery in the high-load current mode.

The capacity at a 5 A discharge current mode increases with the increased carbon fiber content as shown in Examples 1 to 8, but the capacity does not significantly increase when the carbon fiber content increases to 6 percent by weight as shown Example 21. Also, the capacity does not significantly increase when the carbon fiber content decreases to 0.01 percent by weight as shown in Example 20. Thus, the capacity is significantly improved and the internal resistance is reduced when the carbon fiber content is in a range of 0.02 percent by weight to 5 percent by weight, and particularly 0.5 percent by weight to 4 percent by weight.

As shown in FIG. 2, a carbon fiber content exceeding 5 percent by weight increases the internal resistance at 23° C., whereas a carbon fiber content of less than 0.02 percent by weight significantly increases the internal resistance at 23° C. Accordingly, it is preferable that the carbon fiber content be in a range of 0.02 percent by weight to 5 percent by weight, as

TABLE 1

| Example | Carbon Fiber VGCF content (% by weight) | Carbon Flake KS-15 content (% by weight) | KS-15/ VGCF Ratio | Initial Capacity (mAh) | Capacity at 5 A (mAh) | Internal Resistance at 25° C. (mΩ) |
|---|---|---|---|---|---|---|
| 1 | 1 | 5 | 5.00 | 1,603 | 1,053 | 55 |
| 2 | 3 | 5 | 1.67 | 1,610 | 1,055 | 54 |
| 3 | 4 | 5 | 1.25 | 1,608 | 950 | 59 |
| 4 | 4.8 | 5 | 1.04 | 1,601 | 710 | 64 |
| 5 | 5 | 5 | 1.00 | 1,600 | 700 | 66 |
| 6 | 0.5 | 5 | 10.00 | 1,605 | 985 | 58 |
| 7 | 0.05 | 5 | 100.00 | 1,606 | 698 | 66 |
| 8 | 0.02 | 5 | 250.00 | 1,602 | 605 | 70 |
| 9 | 1 | 10 | 10.00 | 1,603 | 880 | 61 |
| 10 | 1 | 20 | 20.00 | 1,602 | 680 | 67 |
| 11 | 1 | 28 | 28.00 | 1,600 | 609 | 69 |
| 12 | 1 | 30 | 30.00 | 1,599 | 600 | 70 |
| 13 | 1 | 1 | 1.00 | 1,605 | 785 | 62 |
| 14 | 1 | 0.5 | 0.50 | 1,608 | 751 | 62 |
| 15 | 1 | 0.2 | 0.20 | 1,610 | 620 | 69 |
| 16 | 1 | 0.1 | 0.10 | 1,615 | 601 | 70 |
| 17 | 0 | 0 | — | 1,600 | 481 | 83 |
| 18 | 1 | 0 | 0.00 | 1,625 | 510 | 75 |
| 19 | 0 | 5 | — | 1,602 | 509 | 75 |
| 20 | 0.01 | 5 | 500.00 | 1,603 | 511 | 74 |
| 21 | 6 | 5 | 0.83 | 1,590 | 510 | 75 |
| 22 | 1 | 0.05 | 0.05 | 1,601 | 512 | 73 |
| 23 | 1 | 40 | 40.00 | 1,575 | 499 | 78 |

These results show that each negative electrode containing at least one of the carbon fibers and the carbon flakes exhibits a higher capacity at a constant current of 5 A and a smaller internal resistance than those of the negative electrode not containing the carbon fibers and the carbon flakes shown in Example 17. In addition, the capacity at a constant current of 5 A and the internal resistance are further improved in each negative electrode containing both the carbon fibers and the carbon flakes compared to each negative electrode containing either the carbon fibers or the carbon flakes.

shown in range A in FIG. 2, and particularly 0.5 percent by weight to 4 percent by weight, as shown in range A' in FIG. 2.

The capacity at a 5 A discharge current mode increases with the increased carbon flake content as shown in Examples 1 and 9 to 16, but the capacity does not significantly increase when the carbon flake content increases to 40 percent by weight as shown Example 23. Also, the capacity does not significantly increase when the carbon flake content decreases to 0.05 percent by weight as shown in Example 22. Thus, the capacity is significantly improved and the internal resistance is reduced when the carbon flake content is in a range of 0.1 percent by weight to 30 percent by weight, and particularly 1 percent by weight to 10 percent by weight.

As shown in FIG. 3, a carbon flake content exceeding 30 percent by weight increases the internal resistance at 23° C. without a significant increase in the capacity, whereas a carbon flake content of less than 0.1 percent by weight significantly results in significant deterioration of these characteristics. Accordingly, it is preferable that the carbon flake content be in a range of 0.1 percent by weight to 30 percent by weight, as shown in range B in FIG. 3, and particularly 1 percent by weight to 10 percent by weight, as shown in range B' in FIG. 3.

FIG. 4 is a graph of the relationship between the capacity at a 5 A discharge current mode and the ratio by weight of the carbon flakes to the carbon fibers. It is preferable that the ratio be in a range of 0.2 to 100, as shown in range C in FIG. 4, and particularly 0.4 to 20, a shown in range C' in FIG. 4.

Obviously many modifications and variations of the present invention are possible in the light of the above description. For example, the sizes and types of the carbon fibers and the carbon flakes can be changed and combined without restriction. Moreover, fine carbon granules and other any additives may be added to the carbon fibers and the carbon flakes.

The invention claimed is:

1. A nonaqueous electrolyte secondary battery comprising:
a positive electrode comprising a positive-electrode active material;
a negative electrode comprising a particulate negative-electrode active material, carbon fibers, and carbon flakes; and
a nonaqueous electrolyte solution,
wherein,
said positive-electrode active material and said negative-electrode active material are capable of intercalating and deintercalating lithium,
said carbon fibers and said carbon flakes are disposed in interstices between said particulate negative electrode active material,
a ratio by weight of said carbon flakes to said carbon fibers in said negative electrode is in a range of about 0.2 to about 100,
said carbon flakes have a (002) interplanar spacing of less than about 0.3360 nm by X-ray diffractometry and a thickness of (002) c-axis crystallites of at least about 100 nm,
said carbon flakes have a bulk density, as measured in accordance with Japanese Industrial Standard K-1469, is about 0.4 g/cm$^3$ or less,
a maximum particle size of said carbon flakes, as measured by laser diffraction, is about 50 μm or less, and
the particulate negative-electrode active material is substantially spherical.

2. A nonaqueous electrolyte secondary battery according to claim 1, wherein the particulate negative-electrode active material has a sphericity of about 2.23 as measured by pycnometry.

3. A nonaqueous electrolyte secondary battery according to claim 1, wherein the particulate negative-electrode active material has an average diameter of about 1 μm to about 100 μm.

4. A nonaqueous electrolyte secondary battery according to claim 1, wherein said particulate negative-electrode active material is about 65% wt. to about 99.88% wt. of said negative electrode.

5. A nonaqueous electrolyte secondary battery according to claim 1, wherein said carbon fibers are about 0.02% wt. to about 5% wt. of said negative electrode.

6. A nonaqueous electrolyte secondary battery according to claim 5, wherein said carbon fibers are about 0.02% wt. to about 4% wt of said negative electrode.

7. A nonaqueous electrolyte secondary battery according to claim 6, wherein said carbon fibers are about 0.5% wt. to about 4% wt. of said negative electrode.

8. A nonaqueous electrolyte secondary battery according to claim 1, wherein said carbon flakes are about 0.1% wt. to about 30% wt. of said negative electrode.

9. A nonaqueous electrolyte secondary battery according to claim 8, wherein said carbon flakes are about 1% wt. to about 20% wt of said negative electrode.

10. A nonaqueous electrolyte secondary battery according to claim 9, wherein said carbon flakes are about 1% wt. to about 10% wt. of said negative electrode.

11. A nonaqueous electrolyte secondary battery according to claim 1, wherein said carbon flakes have an average diameter of about 0.5 μm to about 50 μm and an average thickness of about 0.01 μm to about 1 μm.

12. A nonaqueous electrolyte secondary battery according to claim 1, wherein the ratio by weight of said carbon flakes to said carbon fibers in said negative electrode is about 0.4 to about 20.

13. A nonaqueous electrolyte secondary battery according to claim 12, wherein the ratio by weight of said carbon flakes to said carbon fibers in said negative electrode is about 1.25 to about 10.

14. A nonaqueous electrolyte secondary battery according to claim 13, wherein the ratio by weight of said carbon flakes to said carbon fibers in said negative electrode is about 1.67 to about 5.

15. A nonaqueous electrolyte secondary battery according to claim 1, wherein said positive-electrode active material comprises a Li compound oxide and said negative-electrode active material comprises at least one of a Li compound oxide, an amorphous metal oxide, and a carbonaceous material.

16. A nonaqueous electrolyte secondary battery according to claim 1, wherein said nonaqueous electrolyte solution comprises at least one nonaqueous solvent selected from the group consisting of propylene carbonate, ethylene carbonate, vinylene carbonate, dimethyl carbonate, diethyl carbonate, methyl ethyl carbonate, 1,3-dioxolane, 4-methyl-1,3-dioxolane, diethyl ether, sulfolane, methylsulfolane, acetonitrile, and propionitrile.

17. A nonaqueous electrolyte secondary battery according to claim 16, wherein said nonaqueous electrolyte solution comprises a nonaqueous solvent mixture of ethylene carbonate and dimethyl carbonate.

18. A nonaqueous electrolyte secondary battery according to claim 17, wherein said nonaqueous electrolyte solution comprises at least one electrolyte selected from the group consisting of LiClO$_4$, LiPF$_6$, LiBF$_4$, LiB(C$_6$H$_5$)$_4$, LiCI, LiBr, CH$_3$SO$_3$Li, and CF$_3$SO$_3$Li.

19. A nonaqueous electrolyte secondary battery according to claim 18, wherein said electrolyte solution comprises LiPF$_6$.

20. A nonaqueous electrolyte secondary battery according to claim 1, wherein said carbon fibers are graphitized at a constant temperature of at least 2000° C.

21. A nonaqueous electrolyte secondary battery according to claim 1, wherein said positive electrode and said negative electrode are wound together with a separator positioned therebetween.

22. A nonaqueous electrolyte secondary battery comprising:
- a positive electrode comprising a positive-electrode active material;
- a negative electrode comprising substantially spherical particulate negative-electrode active material, carbon fibers, and carbon flakes; and
- a nonaqueous electrolyte solution, wherein,
- said positive-electrode active material and said negative-electrode active material are capable of intercalating and deintercalating lithium,
- said substantially spherical particulate negative-electrode active material has an average diameter of about 1 μm to about 100 μm and is present at about 65% wt. to about 99.88% wt. of said negative electrode,
- said carbon flakes and said carbon fibers are disposed in the interstices between said particulate negative electrode active material; and a ratio by weight of said carbon flakes to said carbon fibers in said negative electrode is in a range of about 0.4 to about 20,
- said carbon fibers are produced by vapor phase deposition; graphitized at a constant temperature of at least about 2000° C.; and present at about 0.5% wt. to about 4% wt. of said negative electrode,
- said carbon flakes have a (002) interplanar spacing of less than about 0.3360 nm by X-ray diffractometry and a thickness of (002) c-axis crystallites of at least about 100nm or more,
- a bulk density of said carbon flakes, as measured in accordance with Japanese Industrial Standard K-1469, is about 0.4 g/cm$^3$ or less,
- the maximum particle size of said carbon flakes, as measured by laser diffraction, is about 50 μm or less, and
- the carbon flakes are present in an amount of about 1% wt. to about 20% wt. of said negative electrode.

* * * * *

UNITED STATES PATENT AND TRADEMARK OFFICE
CERTIFICATE OF CORRECTION

PATENT NO. : 7,498,101 B2
APPLICATION NO. : 11/564619
DATED : March 3, 2009
INVENTOR(S) : Akira Yamaguchi et al.

It is certified that error appears in the above-identified patent and that said Letters Patent is hereby corrected as shown below:

ON THE TITLE PAGE

"(75) Inventors: Atsuo Omaru, Fukushima (JP)"

should be

--(75) Inventors: Atsuo Omaru, Kanagawa (JP)--

Signed and Sealed this

Eighteenth Day of August, 2009

David J. Kappos
*Director of the United States Patent and Trademark Office*